United States Patent
Dieckmann et al.

(10) Patent No.: US 11,203,825 B2
(45) Date of Patent: Dec. 21, 2021

(54) METHOD FOR PRODUCING A MULTILAYER FIBER COMPOSITE PREFORM FOR A FIBER COMPOSITE COMPONENT

(71) Applicant: Bayerische Motoren Werke Aktiengesellschaft, Munich (DE)

(72) Inventors: Maike Dieckmann, Landshut (DE); Florian Rapp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 207 days.

(21) Appl. No.: 16/576,134

(22) Filed: Sep. 19, 2019

(65) Prior Publication Data

US 2020/0010987 A1    Jan. 9, 2020

Related U.S. Application Data

(63) Continuation of application No. PCT/EP2018/063452, filed on May 23, 2018.

(30) Foreign Application Priority Data

Jun. 27, 2017  (DE) ..................... 10 2017 210 815.0

(51) Int. Cl.
    *D04C 3/12*     (2006.01)
    *B29B 11/16*    (2006.01)
    *D04C 1/04*     (2006.01)

(52) U.S. Cl.
    CPC ............... *D04C 3/12* (2013.01); *B29B 11/16* (2013.01); *D04C 1/04* (2013.01); *D10B 2101/12* (2013.01)

(58) Field of Classification Search
    CPC ... D04C 1/04; D04C 1/02; D04C 1/00; D04C 1/06; D04C 3/12; D04C 3/02; D04C 3/00; D10B 2101/12; D10B 2505/02
    (Continued)

(56) References Cited

U.S. PATENT DOCUMENTS

| | | | |
|---|---|---|---|
| 3,815,468 A | | 6/1974 | Matt et al. |
| 4,519,290 A | * | 5/1985 | Inman ............... B29B 11/16 156/148 |

(Continued)

FOREIGN PATENT DOCUMENTS

| | | |
|---|---|---|
| CN | 103347466 A | 10/2013 |
| DE | 10 2009 032 005 A1 | 1/2011 |

(Continued)

OTHER PUBLICATIONS

International Search Report (PCT/ISA/210) issued in PCT Application No. PCT/EP2018/063452 dated Aug. 13, 2018 with English translation (six (6) pages).

(Continued)

*Primary Examiner* — Khoa D Huynh
*Assistant Examiner* — Uyen T Nguyen
(74) *Attorney, Agent, or Firm* — Crowell & Moring LLP

(57) ABSTRACT

A method produces a fiber composite preform for a fiber composite component. The fiber composite preform has a plurality of layers of a fiber roving. The method includes: providing a support core for arranging the fiber roving s on a braiding device, the support core having a support core longitudinal axis, producing a first braided fabric layer from fiber rovings on the support core in a first braiding direction parallel to the support core longitudinal axis of the support core by the braiding device, and producing a second braided fabric layer from fiber rovings on the first braided fabric layer by the braiding device. The second braided fabric layer is produced in a second braiding direction parallel to the support core longitudinal axis, the second braiding direction being opposite the first braiding direction.

8 Claims, 3 Drawing Sheets

(58) Field of Classification Search
USPC .............................................................. 87/8
See application file for complete search history.

(56) References Cited

U.S. PATENT DOCUMENTS

| | | | | | |
|---|---|---|---|---|---|
| 5,203,249 | A | * | 4/1993 | Adams | D04C 3/36 87/34 |
| 5,398,586 | A | * | 3/1995 | Akiyama | D04C 1/06 87/6 |
| 5,476,027 | A | * | 12/1995 | Uchida | D04C 1/06 87/29 |
| 6,287,122 | B1 | * | 9/2001 | Seeram | D04C 1/06 433/220 |
| 2007/0193439 | A1 | * | 8/2007 | Gessler | D04C 1/02 87/8 |
| 2010/0170990 | A1 | * | 7/2010 | Wybrow | B29B 11/16 244/123.8 |
| 2011/0290405 | A1 | | 12/2011 | Kaenzig et al. | |
| 2013/0305465 | A1 | * | 11/2013 | Siegismund | D04C 3/48 12/146 C |
| 2013/0305911 | A1 | * | 11/2013 | Masson | D04C 3/34 87/9 |

FOREIGN PATENT DOCUMENTS

| | | |
|---|---|---|
| DE | 10 2010 010 513 A1 | 9/2011 |
| EP | 2 206 597 A2 | 7/2010 |
| JP | 7-189096 A | 7/1995 |
| JP | 7-216701 A | 8/1995 |
| JP | 9-277391 A | 10/1997 |
| WO | WO 2005/098117 A1 | 10/2005 |
| WO | WO 2011/111564 A1 | 9/2011 |
| WO | WO 2012/082440 A1 | 6/2012 |

OTHER PUBLICATIONS

German-language Written Opinion (PCT/ISA/237) issued in PCT Application No. PCT/EP2018/063452 dated Aug. 13, 2018 (six (6) pages).
German-language Search Report issued in counterpart German Application No. 10 2017 210 815.0 dated Oct. 27, 2017 with partial English translation (13 pages).
German-language Office Action issued in counterpart German Application No. 10 2017 210 815.0 dated Nov. 6, 2017 with partial English Translation (10 pages).
Chinese-language Office Action issued in Chinese Application No. 201880024435.6 dated Feb. 20, 2021 with English translation (12 pages).
Chinese-language Office Action issued in Chinese Application No. 201880024435.6 dated Jun. 23, 2020 with English translation (15 pages).
Chinese-language Office Action issued in Chinese Application No. 201880024435.6 dated Jul. 2, 2021 with English translation (13 pages).

* cited by examiner

METHOD FOR PRODUCING A MULTILAYER FIBER COMPOSITE PREFORM FOR A FIBER COMPOSITE COMPONENT

CROSS REFERENCE TO RELATED APPLICATIONS

This application is a continuation of PCT International Application No. PCT/EP2018/063452, filed May 23, 2018, which claims priority under 35 U.S.C. § 119 from German Patent Application No. 10 2017 210 815.0, filed Jun. 27, 2017, the entire disclosures of which are herein expressly incorporated by reference.

BACKGROUND AND SUMMARY OF THE INVENTION

The present invention relates to a method for producing a fiber composite preform having a plurality of layers of fiber rovings for a fiber composite component, in particular for a motor vehicle.

Reducing the total weight of a motor vehicle is of increasing importance in the production of motor vehicles. One reason therefor is that a reduced total weight is directly correlated with an improvement in terms of driving dynamics, a reduction in the fuel consumption, as well as a reduction in emissions. This correlation is in particular based on the physical law of mass inertia, according to which a force which is proportional to the mass is required for accelerating a mass at a predefined acceleration. A reduction in the mass of a vehicle, for example of an automobile, by substituting heavier components with lighter components, thus means that a lower driving force is required for achieving a predefined acceleration.

A known approach for reducing the vehicle weight is the use of lighter materials which are configured for generating components having a similar load bearing capability at a lower component weight. In this context, steel-sheet components such as, for example, pipes, supports, body panels, or the like are replaced by fiber composite components such as, for example, fiber-plastics composite components (FRP components), for example. Fiber composite components as compared to sheet-metal components have a particularly low specific weight at a particularly high rigidity. Fiber composite components have a fiber component part which is penetrated or integrated, respectively, by a matrix material such as, for example, a resin. The production of fiber composite components can be performed, for example, by means of a resin injection method which is also referred to as injection pressing or resin transfer molding (RTM), or of a wet pressing method. In the case of injection pressing, a preform or a fiber composite preform, respectively, from fibrous material is incorporated in an injection-pressing tool and with the injection-pressing tool closed is impregnated of penetrated, respectively, by the matrix material. In the case of wet pressing, the preform or the fiber composite preform, respectively, is first impregnated or penetrated, respectively, by the matrix material, for example in an immersion bath, and subsequently compressed in a wet-pressing tool. In the case of both methods, the production of the fiber composite preform can be performed, for example, by a winding process in which the fibrous material is wound about a winding core.

Braiding is particularly suitable in the automated production of fiber composite preforms. A support core from a support core material, for example a plastics material or foam material, respectively, which does not yield in the braiding process, or yields only to a defined extent, respectively, is used as the basis for a braiding process. In the braiding process, the support core is guided by means of one or a plurality of robots or a drawing-off device through a braiding device. By means of the braiding device, the support core can thus be braided with a surrounding fiber roving, for example from aramid fiber, glass fiber, or carbon fiber. In the braided fabric, a differentiation is made between braiding threads which are braided obliquely to a support core longitudinal axis of the support core, and filler threads which are disposed parallel to the support core longitudinal axis. A tube produced by braiding deposits itself on the support core so as to be true to the contour of the latter. The excess fibers of the fiber rovings are subsequently cut off from the braided fabric by means of a cutting device. In this way, the fiber composite preform which already corresponds to a final contour of the fiber composite component to be produced is created.

Mechanical properties of the fiber composite preform can be influenced in a targeted manner by a selection of material pairings for braiding threads and filler threads, as well as an angle of the braiding threads in relation to the support core longitudinal axis. Aramid fibers, glass fibers, as well as carbon fibers have proven successful as fiber roving materials. Fiber composite components which are capable of bearing high loads and which have a substantially lower total weight than known metal components can be produced by means of fiber roving materials of this type.

A run-up region which is configured ahead of and/or on the support core is usually required in the braiding process. By virtue of the influence of frictional effects, the braided fabric from fiber rovings is not yet fully developed in the run-up region. The run-up region is created in particular in that the generated braided fabric is cut off after each braided core and fiber ends which are already braided and remain in the braiding machine thus hang in free air. A disadvantage of the run-up regions is that the braided fabric in the run-up region has a lower braiding density than in the other regions. Dissimilar braiding densities have the effect that the fiber composite preform in the longitudinal direction thereof, thus along the support core longitudinal axis, has differences in terms of permeability. In order to have an ideally minor cutting waste, the run-up region is typically dimensioned so as to be as short as possible; the braided fabric is thus started by way of an ideally minor projection in relation to the support core in order for fiber roving material to be saved. This measure often has the negative effect that the braided fabric on the support core does not yet have the predefined nominal braiding density of said braided fabric. In other words, this means that the run-up region extends into the fiber composite preform to be produced.

By virtue of the differences in terms of the permeability of the regions of the fiber composite preform component walls that are dissimilarly configured, in particular dissimilar component wall thicknesses, arise in the infiltration and curing of the fiber composite preform, for example in an RTM process. Differences of this type can have a negative influence on geometric and mechanical properties and an visual appearance of the finished fiber composite component, and can even lead to rejected parts. This effect at the end region of the fiber composite preform is reinforced with each further layer in particular in the case of multilayered fiber composite preforms in which a plurality of layers of braided fiber roving fabrics are disposed on top of one another.

It is therefore an object of the present invention to eliminate or at least partially eliminate the disadvantages described above in a method for producing a multilayered fiber composite preform for a fiber composite component. It is in particular an object of the present invention to achieve a method for producing a multilayer fiber composite preform for a fiber composite component which in a simple and cost-effective manner avoids or at least significantly reduces differences in terms of permeability of this type between regions of the fiber composite preform.

According to the invention, the object is achieved by a method for producing a fiber composite preform having a plurality of layers of fiber rovings for a fiber composite component. The method comprises the following steps:

providing a support core for disposing the fiber rovings on a braiding device, wherein the support core has a support core longitudinal axis;

generating a first braided fabric layer from fiber rovings on the support core, in a first braiding direction parallel to the support core longitudinal axis of the support core, by way of the braiding device; and generating a second braided fabric layer from fiber rovings on the first braided fabric layer by way of the braiding device.

The second braided fabric layer herein is generated in a second braiding direction parallel to the support core longitudinal axis, wherein the second braiding direction is counter to the first braiding direction.

The method is configured for producing a fiber composite preform which has a plurality of layers of fiber rovings. A layer of fiber rovings in the context of the invention is understood to be a braided fabric layer from fiber roving s that are interbraided with one another. In the case of a plurality of layers, this means that at least two braided fabric layers are disposed on top of one another. The fiber composite preform to be produced can also have three, four, or even more, braided fabric layers disposed on top of one another which are preferably generated so as to correspond to the first two braided fabric layers and are disposed on top of the first two braided fabric layers.

A fiber roving is a bundle, strand, or multi-filament yarn from filaments or continuous fibers, respectively, which are disposed in parallel, said fiber roving being capable of being used for generating a fiber composite preform for producing a fiber composite component. The individual filaments are configured as glass fibers, aramid fibers, or carbon fibers, for example.

When providing the support core, the latter is disposed in a starting position on the braiding device. The braiding process, thus the process for generating the first braided fabric layer, can be initiated in the starting position. The support core serves as a counter bearing for the fiber rovings in the braiding process, so as to impart the braided fabric layer a defined shape. The braided fabric layer generated in the braiding process is adapted to the shape of the support core such that said braided fabric layer hugs said support core in an ideally uniform manner. In the braiding process it can be provided that the support core is moved along the braiding device or through the braiding device. Alternatively, the support core can be held so as to be locationally fixed, and the braiding device can be moved for braiding. It can likewise be provided in the context of the invention that the braiding device as well as support core are moved in the braiding process.

The first braided fabric layer from fiber rovings is generated in the first braiding direction along the support core longitudinal axis. This means that a relative movement of the braiding device and the support core is carried out in the first braiding direction when generating the first braided fabric layer. The first braiding direction is defined in such a manner that the movement of the braiding device relative to the support core is performed from a first support core end in the direction of a second support core end. During this relative movement, the fiber rovings are braided by the braiding device so as to form the first braided fabric layer. The braiding is performed in such a manner that a braided fabric density of the first braided fabric layer on the support core is configured so as not to be consistent, or non-uniform, respectively, along the support core longitudinal axis. The first braided fabric layer can be generated in such a manner, for example, that part of the first braided fabric layer on the support core is configured as a run-up region having a lower braided fabric density than a remaining braided fabric density of the first braided fabric layer.

The second braided fabric layer from fiber rovings is generated in the second braiding direction along the support core axis. This means that a relative movement of the braiding device and the support core is carried out in the second braiding direction when generating the second braided fabric layer. The second braiding direction is defined in such a manner that the movement of the braiding device relative to the support core is performed from the second support core end in the direction of the first support core end. The second braiding direction is thus counter to the first braiding direction. During this relative movement, the fiber rovings are braided by the braiding device so as to form the second braided fabric layer. The braiding is performed in such a manner that a braided fabric density of the second braided fabric layer on the support core is configured so as not to be consistent, or non-uniform, respectively, along the support core longitudinal axis. The second braided fabric layer can be generated in such a manner, for example, that part of the second braided fabric layer on the support core is configured as a run-up region having a lower braided fabric density than a remaining braided fabric density of the second braided fabric layer. The second braided fabric layer herein is disposed on the support core in such a manner that run-up regions of the first braided fabric layer and of the second braided fabric layer are disposed on different ends of the support core.

The method according to the invention for producing a fiber composite preform having a plurality of tiers of fiber rovings as compared to conventional methods has the advantage that a fiber composite preform having a uniformly configured permeability is capable of being produced by said method with simple means and in a cost-effective manner. This is particularly advantageous with a view to a downstream impregnating process of the fiber composite preform using a matrix material for producing a fiber composite component, since a uniformly configured permeability facilitates a more uniform impregnation with the matrix material. In this way, the production of fiber composite components having predefined geometric and mechanical properties as well as a predefined visual appearance are significantly improved.

According to one preferred refinement of the invention, it can be provided in a method that the providing of the support core is performed by means of a robotic device. The robotic device has, for example, a robotic arm by way of which the support core is movable to the starting position. The robotic device preferably has a gripping device which is disposed on the robotic arm and is configured for gripping and/or clamping the support core. A robotic device has the advantage that an alignment of the support core relative to the braiding device is capable of being implemented in a very precise manner. This can be advantageous in particular between generating the first braided fabric layer and generating the second braided fabric layer, in that the support core is in each case capable of being disposed relative to the braiding device in such a manner that the first braided fabric layer is capable of being generated in the first braiding direction and the second braided fabric direction is capable of being generated in the second braiding direction.

It is preferred according to the invention that, after generating the first braided fabric layer and/or after generating the second braided fabric layer, projecting fibers of the braided fiber roving are cut off by means of a cutting device. The cutting device preferably has a rotating cutter for severing the fibers. After a braiding process, thus generating a braided fabric layer, projecting fibers or filaments, respectively, of the braided fabric layer are disposed at ends of the support core, said fibers or filaments having to be severed as waste from the braided fabric in order for the fiber composite preform to be produced. Severing said fibers after generating the first braided fabric layer and prior to generating the second braided fabric layer has the advantage that said fibers can no longer impede the generation of the second braided fabric layer. A generation of the second braided fabric layer according to the intended use is thus guaranteed.

Furthermore preferably, the support core after generating the first braided fabric layer and prior to generating the second braided fabric layer is rotated by 180°. Rotating the support core is preferably performed by means of a robotic device, in particular a robotic device having a robotic arm for moving the support core as well as a gripping or clamping device for gripping or clamping, respectively, the support core. Rotating is preferably performed about a vertical axis, wherein the support core longitudinal axis herein is horizontally disposed. By rotating the support core by 180° it is guaranteed that a process management of the braiding device can remain the same for generating the individual layers, wherein it is ensured with simple means as well as in a cost-effective manner by said rotating that the second braiding direction is counter to the first braiding direction. In the context of the invention it can alternatively be provided that opposite braiding directions are guaranteed by converting the process management of the braiding device in a corresponding manner. Rotating the support core is not required in this case.

In one particularly preferred design embodiment of the method the first braided fabric layer is generated having a first braided fabric layer density profile and the second braided fabric layer is generated having a second braided fabric layer density profile, wherein the first braided fabric layer density profile and the second braided fabric layer density profile are configured in such a manner that a total layer density from the first braided fabric layer and the second braided fabric layer is consistent across the support core length of the support core. This means that a respective sum from the first braided fabric layer density and the second braided fabric layer density is identical for each longitudinal axis portion of the support core. This has the advantage that a permeability of the fiber composite preform is consistent, or at the substantially consistent, respectively, across the length of said fiber composite preform.

The first braided fabric layer density profile as well as the second braided fabric layer density profile are preferably in each case generated in a graduated manner by way of constant gradient. A graduated braided fabric layer density profile having a constant gradient means that the braided fabric layer density of the braided fabric layer from a first end of the braided fabric layer to a second end of the braided fabric layer varies continuously as well as at a constant density variation along the support core longitudinal axis. For example, the first braided fabric layer density at the first end has a maximum and at the second end has a minimum. The second braided fabric layer density thus has a minimum at the first end and the maximum at the second end. The gradients for the first braided fabric layer and the second braided fabric layer are identical in terms of the value but have reversed algebraic signs.

It can be provided according to the invention that further braided fabric layers on the braided support core are generated in a manner analogous to that of the first braided fabric layer and the second braided fabric layer. The further braided fabric layers are preferably generated in such a manner that differences in the braided fabric layer density of one braided fabric layer are equalized or at least partially equalized by a following braided fabric layer.

Furthermore preferably, a support core which is configured so as to be mirror-symmetrical about a symmetry plane that is disposed so as to be perpendicular to the support core longitudinal axis is provided. Furthermore preferably, the support core is configured so as to be rotationally symmetrical about the support core longitudinal axis or so as to be segment-symmetrical. In the case of a segment-symmetrical configuration, the support core has a plurality of support core segments which are distributed about the support core longitudinal axis and are of identical or at least substantially identical configuration. A support core of this type is particularly suitable for an automated braiding process by means of a braiding device. The mirror-symmetry furthermore has the advantage that the compensation in terms of the braided fabric layer densities by adjacent braided fabric layers in the end regions is more readily achievable.

A fiber roving from carbon fibers is preferably used for generating the braided fabric layers. Carbon fibers, in particular by virtue of the advantageous mechanical properties thereof, are particularly suitable for the production of fiber composite components for motor vehicles.

It is preferred according to the invention that a radial braiding machine is used as the braiding device. Support cores can be braided with simple means as well as in a reliable manner with braided fabric layers by means of a radial braiding machine.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
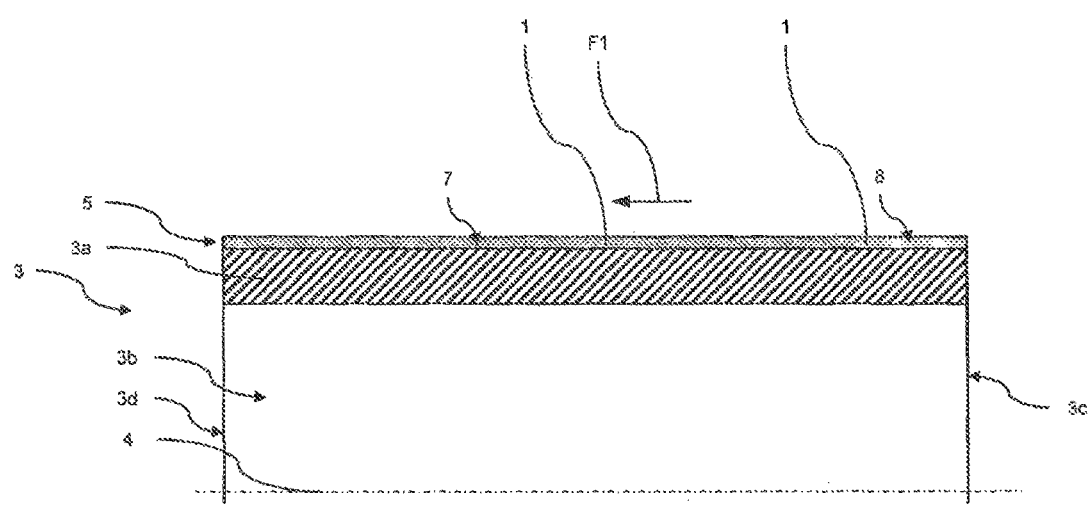
FIG. 1 shows a fragment of a support core encased with a first braided fabric layer, in a lateral view.
Figure 2:
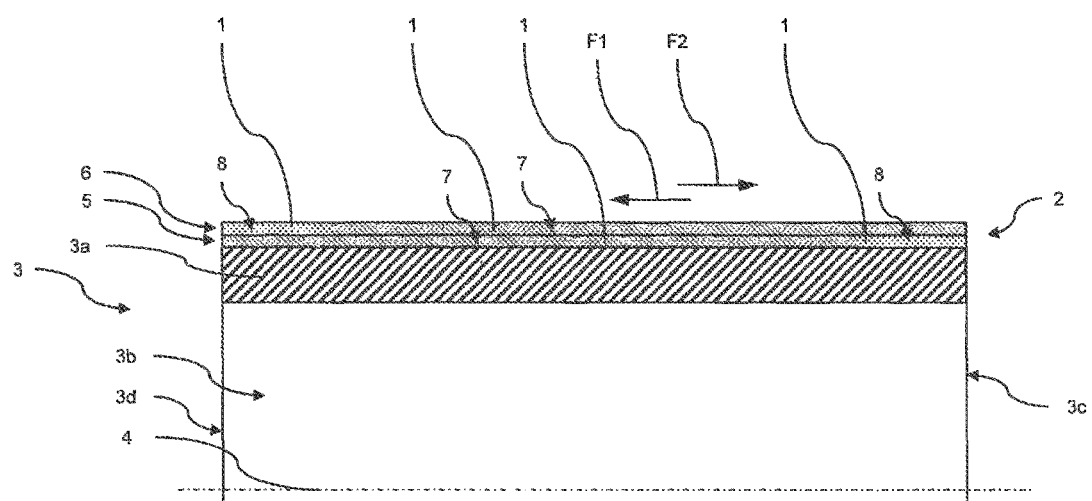
FIG. 2 shows a fragment of the support core from FIG. 1 after the encasing with a second braided fabric layer, in a lateral view.
Figure 3:
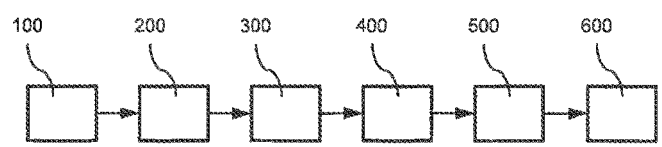
FIG. 3 shows a preferred embodiment of the method according to the invention in a sequence diagram.

Elements with identical functions and operating modes are in each case provided with the same reference signs in FIGS. 1 to 3.

A fragment of a support core 3 that is encased with a first braided fabric layer 5 is schematically depicted in a lateral view in FIG. 1. The support core 3 is configured so as to be rotationally symmetrical about a support core longitudinal axis 4 and has an encircling support core wall 3*a* which radially surrounds a support core cavity 3*b*. A first braided fabric layer 5 from fiber rovings 5 is disposed on an external side of the support core 3 or of the support core wall 3*a*, respectively, that faces away from the support core longitudinal axis 4. The first braided fabric layer 5 by means of the method according to the invention has been generated from a first support core end 3*c* in a first braiding direction F1 toward a second support core end 3*d*.

The first braided fabric layer 5 at the first support core end 3*c* has a low braided fabric density region 8 and in the remaining portion has a high braided fabric density region 7. The low braided fabric density region 8 has a lower braided fabric density than the high braided fabric density region 7. This is due to the first braided fabric layer 5 at the first support core end 3*c* having been generated as an initial region in which a nominal braided fabric density has not yet been achieved by virtue of technical limitations.

A fragment of the support core 3 from FIG. 1 is schematically illustrated in a lateral view in FIG. 2, wherein a second braided fabric layer 6 from fiber rovings 5 is now disposed on the first braided fabric layer 5. The first braided fabric layer 5 and the second braided fabric layer 6 conjointly form a fiber composite preform 2. The second braided fabric layer 6 by means of the method according to the invention has been generated from the second support core end 3*d* in a second braiding direction F2, counter to the first braiding direction F1, toward the first support core end 3*c*.

The second braided fabric layer 6 at the second support core end 3*d* has the low braided fabric density region 8 and in the remaining portion has a high braided fabric density region 7. This is due to the second braided fabric layer 6 at the second support core end 3*d* having been generated as an initial region in which a nominal braided fabric density has not yet been achieved by virtue of technical limitations. On account of generating the first braided fabric layer 5 and the second braided fabric layer 6 in such a manner, negative effects of the low braided fabric density region 8 can at least be partially compensated by way of the high braided fabric density region 7 which are in each case adjacent in the radial direction.

FIG. 3 schematically shows a preferred embodiment of the method according to the invention in a sequence diagram. In a first method step 100, a support core 3 that is configured so as to be rotationally symmetrical about a support core longitudinal axis 4 is provided by means of a robotic device and disposed in a starting position on a braiding device.

In a second method step 200, a first braided fabric layer 5 from fiber rovings 1 is generated by means of the braiding device by braiding on the support core 3. The support core 3 and the braiding device herein are displaced in a mutually relative manner in a first braiding direction F1. The first braided fabric layer 5 is thus generated from a first support core end 3*c* toward a second support core end 3*d* of the support core and at the first support core end 3*c* has a lower braided fabric layer density than at the second support core end 3*d*.

In a third method step 300, the support core 3 is rotated by 180° relative to the braiding device such that the alignments of the first support core end 3*c* and the second support core end 3*d* relative to the braiding device are swapped. Alternatively, the same effect can also be achieved by modifying the process management of the braiding device in the braiding process in a corresponding manner.

In a fourth method step 400, a second braided fabric layer 6 is generated by means of the braiding device by braiding on the first braided fabric layer 5. The support core 3 and the braiding device herein are displaced in a mutually relative manner in a second braiding direction F2, counter to the first braiding direction F1. The second braided fabric layer 6 is thus generated from the second support core end 3*d* toward the first support core end 3*c* of the support core and at the first support core end 3*c* has a higher braided fabric layer density than at the second support core end 3*d*.

In a fifth method step 500, excess fibers by means of a cutting device are cut off from the first braided fabric layer 5 and/or the second braided layer 6. In a sixth method step 600, the fiber composite preform 2 produced according to the invention is removed from the support core 3, for example by destroying the support core in a thermal, chemical, and/or mechanical manner.

LIST OF REFERENCE SIGNS

1 Fiber roving
2 Fiber composite preform
3 Support core
3*a* Support core wall
3*b* Support core cavity
3*c* First support core end
3*d* Second support core end
4 Support core longitudinal axis
5 First braided fabric layer
6 Second braided fabric layer
7 High braided fabric density region
8 Low braided fabric density region
100 First method step
200 Second method step
300 Third method step
400 Fourth method step
500 Fifth method step
600 Sixth method step
F1 First braiding direction
F2 Second braiding direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a fiber composite preform having a plurality of layers of fiber rovings for a fiber composite component, the method comprising:
   providing a support core for disposing the fiber rovings on a braiding device, wherein the support core has a support core longitudinal axis;
   generating a first braided fabric layer from fiber rovings on the support core starting from a first end of the support core, in a first braiding direction parallel to the support core longitudinal axis of the support core, by way of the braiding device; and
   generating a second braided fabric layer from fiber rovings on the first braided fabric layer starting from a second end of the support core opposite the first end, by way of the braiding device, wherein
- the second braided fabric layer is generated in a second braiding direction parallel to the support core longitudinal axis, wherein the second braiding direction is counter to the first braiding direction,
- the first braided fabric layer has a first braided fabric layer density profile with a lower first layer density at the first end of the support core than at the second end of the support core,
- the second braided fabric layer has a second braided fabric layer density profile with a lower second layer density at the second end of the support core than at the first end of the support core, and
- the first braided fabric layer density profile and the second braided fabric layer density profile are configured such that a total layer density from the first braided fabric layer and the second braided fabric layer is consistent along the support core longitudinal axis core.

2. The method according to claim 1, wherein
the providing of the support core is performed by a robotic device.

3. The method according to claim 1, further comprising:
after generating the first braided fabric layer and/or after generating the second braided fabric layer, cutting-off projecting fibers of the braided fiber roving by a cutting device.

4. The method according to claim 1, further comprising:
rotating the support core by 180° after generating the first braided fabric layer and prior to generating the second braided fabric layer.

5. The method according to claim 1, wherein
further braided fabric layers on the support core are generated in a manner analogous to that of the first braided fabric layer and the second braided fabric layer.

6. The method according to claim 1, wherein
the support core is configured so as to be mirror-symmetrical about a symmetry plane that is disposed so as to be perpendicular to the support core longitudinal axis.

7. The method according to claim 1, wherein
a fiber roving from carbon fibers is used for generating the first and second braided fabric layers.

8. The method according to claim 1, wherein
a radial braiding machine is used as the braiding device.

* * * * *